(12) United States Patent
Verrelst et al.

(10) Patent No.: US 12,012,960 B2
(45) Date of Patent: Jun. 18, 2024

(54) COMPRESSOR DEVICE AND DEVICE EQUIPPED WITH A BEARING DAMPER

(71) Applicant: ATLAS COPCO AIRPOWER, NAAMLOZE VENNOOTSCHAP, Wilrijk (BE)

(72) Inventors: Bjorn Verrelst, Wilrijk (BE); Nils Vercauteren, Wilrijk (BE); Stijn Pittois, Wilrijk (BE); Axel Van De Walle, Wilrijk (BE)

(73) Assignee: ATLAS COPCO AIRPOWER NAAMLOZE VENNOOTSCHAP, Wilrijk (BE)

( * ) Notice: Subject to any disclaimer, the term of this patent is extended or adjusted under 35 U.S.C. 154(b) by 71 days.

(21) Appl. No.: 17/765,911

(22) PCT Filed: Dec. 15, 2020

(86) PCT No.: PCT/IB2020/061932
§ 371 (c)(1),
(2) Date: Apr. 1, 2022

(87) PCT Pub. No.: WO2021/124086
PCT Pub. Date: Jun. 24, 2021

(65) Prior Publication Data
US 2022/0364561 A1 Nov. 17, 2022

(30) Foreign Application Priority Data
Dec. 18, 2019 (BE) .................................. 2019/5934

(51) Int. Cl.
*F04C 18/16* (2006.01)
*F01C 21/02* (2006.01)
(Continued)

(52) U.S. Cl.
CPC .............. *F04C 18/16* (2013.01); *F01C 21/02* (2013.01); *F01D 25/164* (2013.01); *F16C 27/08* (2013.01);
(Continued)

(58) Field of Classification Search
CPC .. F04C 18/16; F04C 2240/50; F04C 2240/52; F04C 2240/56; F01C 21/02;
(Continued)

(56) References Cited

U.S. PATENT DOCUMENTS

| 5,603,574 A | 2/1997 | Ide et al. |
| 9,926,975 B2 | 3/2018 | Smedresman et al. |
| 2018/0266509 A1 | 9/2018 | Wittenbrink et al. |

FOREIGN PATENT DOCUMENTS

| CA | 2686843 A1 * | 6/2011 | ............ F16C 27/066 |
| DE | 102015221409 A1 | 2/2017 | |

(Continued)

OTHER PUBLICATIONS

Machine Translation of Korean Patent Publication KR-10-2019-0135136A, Inventors: Eun et al.; Title: A Ball Bearing Having Damper; Published: Dec. 6, 2019. (Year: 2019).*
(Continued)

*Primary Examiner* — Mary Davis
(74) *Attorney, Agent, or Firm* — BACON & THOMAS, PLLC

(57) ABSTRACT

Compressor device provided with at least one compressor element and a drive for the compressor element, wherein all bearings of at least one shaft in the compressor device configured to carry static axial load, are provided with a bearing damper which comprises a coupling element and at least one damping element made of damping elastomer material. The bearing damper is installed with the aid of the coupling element between a bearing of the compressor
(Continued)

device and the housing of the compressor device. The coupling element allows little or no movement of the bearing relative to the housing the radial direction compared to the axial direction. The damping element is configured to dampen the axial movement of the bearing relative to the housing.

14 Claims, 6 Drawing Sheets

(51) Int. Cl.
  *F01D 25/16* (2006.01)
  *F16C 19/06* (2006.01)
  *F16C 27/08* (2006.01)
(52) U.S. Cl.
  CPC ...... *F04C 2240/50* (2013.01); *F04C 2240/52* (2013.01); *F04C 2240/56* (2013.01); *F05C 2225/02* (2013.01); *F05C 2251/02* (2013.01); *F16C 19/06* (2013.01); *F16C 2360/43* (2013.01)
(58) Field of Classification Search
  CPC ........ F01D 25/164; F16C 27/08; F16C 19/06; F16C 2360/43; F05C 2225/02; F05C 2251/02

See application file for complete search history.

(56) References Cited

FOREIGN PATENT DOCUMENTS

| EP | 3480469 A1 | 8/2019 | |
|---|---|---|---|
| JP | 1985149524 U | 10/1985 | |
| JP | 1993280532 A | 10/1993 | |
| KR | 1020080040779 A | 5/2008 | |
| KR | 1020190135136 A | 6/2019 | |
| WO | 2007022605 A1 | 3/2007 | |
| WO | WO-2016042055 A1 * | 3/2016 | ............. F16C 25/08 |
| WO | 2019002959 A1 | 1/2019 | |

OTHER PUBLICATIONS

International Search Report and Written Opinion in corresponding PCT Application No. PCT/IB2020/061932, dated Feb. 11, 2021.
BE Search Report in corresponding BE Application No. 201905934, dated Jul. 8, 2020.

* cited by examiner

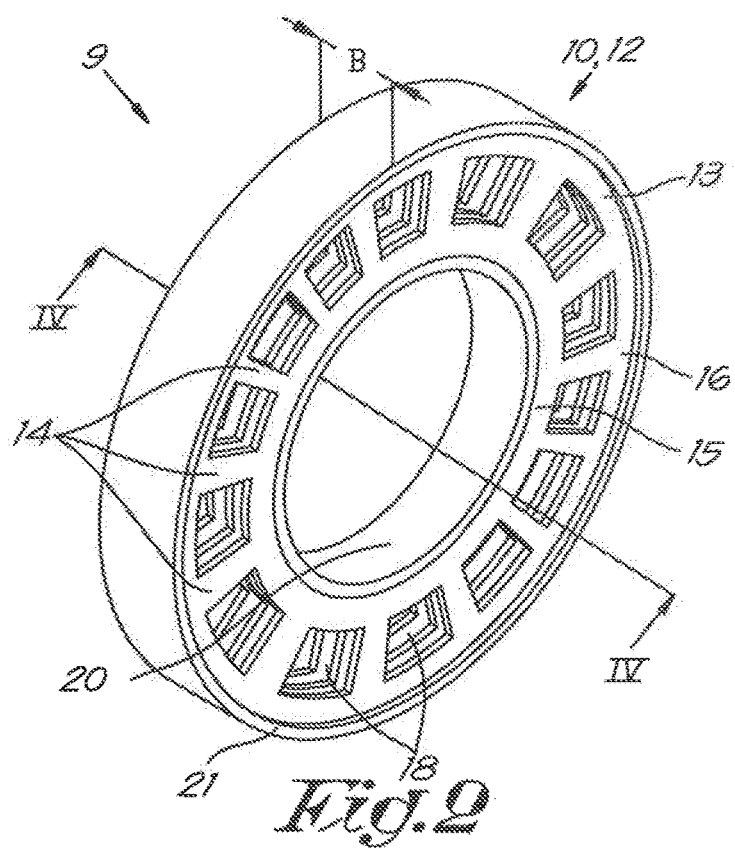
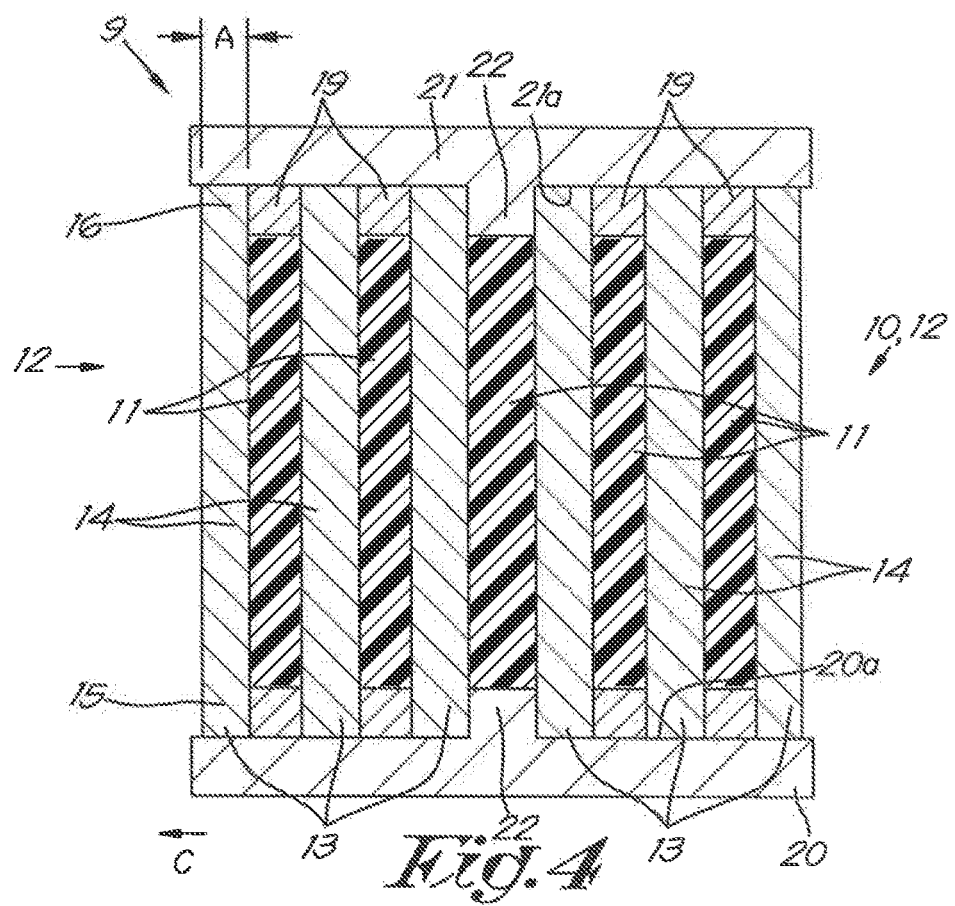

COMPRESSOR DEVICE AND DEVICE EQUIPPED WITH A BEARING DAMPER

The current invention relates to a compressor device equipped with a bearing damper.

In particular, the invention relates to a compressor device with a bearing damper that can be used with a bearing, which is used to install an axis of a drive of, for instance, a compressor element in the drive housing.

BACKGROUND OF THE INVENTION

Compressor elements are known to be driven at high rotational speeds by the drive.

This makes the device sensitive to vibration-related problems that occur at such large rotational speeds, as shaft resonances will be in the operating range. Vibrations or oscillations generated in the compressor element and/or the drive may propagate through the transmission. The excitations or resonances that cause these vibrations are mainly due to drive imbalance and due to pulsations caused by the operating forces of the compressor element.

Various dynamic problems will occur, both in the drive and in the compressor element.

One of these problems is related to axial excitation or resonance of the drive shaft and/or the compressor element, wherein the shaft will vibrate in the axial direction.

Such axial displacements of the shafts will occur mainly in the motor, but may also cause problems in the compressor element, as very strict tolerances apply in the compressor element which allow little or no axial movement of the shaft.

So far, this problem has not been solved in a really satisfactory way.

Typically, heavier bearings will be used to achieve sufficient stiffness and/or bearings will be replaced at regular intervals.

However, use of a flexible coupling between the drive and the compressor element, which provides dynamic decoupling between the drive dynamics and the compressor element as well as damping of excitations or resonances, does have some disadvantages:
  the flexible coupling represents additional expenses;
  the size of the gear transmission is increased and additional bearing provisions are required; and
  the flexible coupling is susceptible to wear because the flexible material degrades over time, so the flexible transmission must regularly be replaced.

For that reason, usually still a so-called direct coupling is preferred, wherein the flexible coupling is omitted, so eventually still the use of heavier bearings and/or regular replacement of bearings is opted for.

SUMMARY OF THE INVENTION

The current invention aims at providing at least a solution to said axial vibrations and other problems.

The current invention relates to a compressor element with a housing provided with at least one compressor element and a drive for the compressor element, characterized in that all bearings of at least one shaft in the compressor device configured for carrying a static axial load, are provided with a bearing damper comprising a coupling element and at least one damping element made of a damping elastomer material, wherein the bearing damper is installed with the aid of the coupling element between a compressor device bearing and the compressor device housing, wherein the coupling element leaves little or no room for movement of the bearing relative to the housing in the radial direction compared to the axial direction, and wherein the damping element is configured to dampen the axial movement of the bearing in relation to the housing.

It should be noted here that said shaft, of which all bearings that carry a static axial load are provided with a bearing damper, may be a drive shaft or a compressor element shaft.

An advantage is that such a bearing damper will be able to dampen axial vibrations, which may, for instance, occur in a drive bearing.

A bearing damper according to the invention will be suitable to secure the bearing in the radial direction, but will allow some flexibility or displacement of the bearing in the axial direction.

The phrase "wherein the coupling element leaves little or no room for movement of the bearing relative to the housing in the radial direction compared to the axial direction" means that the radial bearing displacement relative to the housing is at least a factor 10 smaller than the axial bearing displacement relative to the housing, and preferably a factor 50 smaller and more preferably a factor 100 smaller.

When the bearing damper is installed in the drive housing and around a drive bearing, axial vibrations or bearing vibrations will cause the bearing and housing to move relative to each other in an axial direction, causing the bearing damper and in particular the coupling element to deform.

This will allow the flexible material to absorb deformations, thus dampening the resonances.

Consequently, this will prevent these axial resonances from reducing the service life of the bearing system, or from causing unacceptable dynamic axial displacements of the shaft at which the damping is provided, or from propagation of the vibrations through the machine.

In a practical embodiment, said coupling element is a ring-shaped element comprising at least one ring.

By choosing a suitable material and thickness of the ring, the necessary stiffness in the radial direction and the necessary flexibility in the axial direction can be obtained.

Preferably, the axial stiffness of the bearing damper should be chosen lower than the axial component of the stiffness of the bearing concerned:

$$K\_Ide,ax \leq K\_I,ax$$

where $K\_Ide,ax$ is the axial spring constant of the bearing damper and $K\_I,ax$ is the axial spring constant of the bearing.

The radial stiffness of the bearing damper is preferably of the same magnitude or greater than the radial component of the bearing stiffness:

$$A*K\_I,rad \leq K\_Ide,rad \leq B*K\_I,rad,$$

where $K\_Ide,rad$ is the radial spring constant of the bearing damper and $K\_I,rad$ is the radial spring constant of the bearing,
  where A lies between 0.9 and 0.5 and B lies between 1 and 10 and preferably between 3 and 7.

In a practical embodiment, the rings are held together along their inner edges and/or outer edges by an inner clamping strip and/or an outer clamping strip respectively.

This has the advantage that, by broadening the clamping strips, more than two rings can be used in the bearing damper.

Such a modular system will allow the use of as many rings as necessary, depending on the desired or necessary damping and axial stiffness.

Spacers are preferably provided between the inner edges and the outer edges of two consecutive rings.

This will ensure the correct spacing between the successive rings when placed in the clamping strips.

Alternatively, it is of course also possible to provide grooves in the clamping strips in which, as it were, the rings snap into place.

It is clear that alternative embodiments are also possible instead of the use of clamping strips. For example, the inner clamping strip and the outer clamping strip together with said rings could form one assembly or be made of one piece.

In other words, the clamping strips and the rings are not separate parts in that case.

The invention also concerns a bearing of which the bearing damper and the inner or outer bearing ring form one single unit.

In a practical embodiment, the bearing and the housing or the inner clamping strip and the outer clamping strip are provided with clamping surfaces between which the damping element is located, which clamping surfaces extend in the axial or radial direction.

By providing the damping elements between such clamping surfaces, they will be subjected to compression load, for radial-oriented damping surfaces, or under axial shear stress, for axial-oriented clamping surfaces, due to the axial deformation of the coupling element, which will dampen the axial excitations.

In an alternative embodiment, the ring-shaped element is composed of at least two adjacent rings, with damping elements installed between the rings.

The rings may be fitted with spokes extending between an inner edge and an outer edge of the respective rings, wherein the spokes of the first ring are aligned with the spokes of the second ring, with damping elements attached between the aligned spokes.

The spokes may extend in a radial sense or in a non-radial sense. The spokes may also extend skewed, i.e. at an angle with the radial sense, or these may be not straight, but curved or spiral-shaped spokes.

In that case, the damping elements will be subjected to radial shear stress when the rings deform or bend under the axial excitations.

The invention also concerns a device with a housing and a rotating shaft with a bearing installed in it, characterized in that the bearing is fitted with a bearing damper which comprises a coupling element and at least one damping element made from a damping elastomer material, wherein the bearing damper is fitted between the bearing and the device housing, using the coupling element, wherein the coupling element allows little or no movement of the bearing relative to the housing in the radial direction and wherein the damping element is configured to dampen the axial movement of the bearing relative to the housing.

BRIEF DESCRIPTION OF THE DRAWINGS

To better demonstrate the characteristics of the invention, the following describes, as an example without any restrictive character, some preferred versions of a compressor device according to the invention, with reference to the accompanying drawings, wherein:

FIG. 2 schematically and in perspective shows the bearing damper of FIG. 1;

FIG. 4 shows a cross-section according to line IV-IV in FIG. 2;

DETAILED DESCRIPTION OF THE INVENTION

Figure 1:
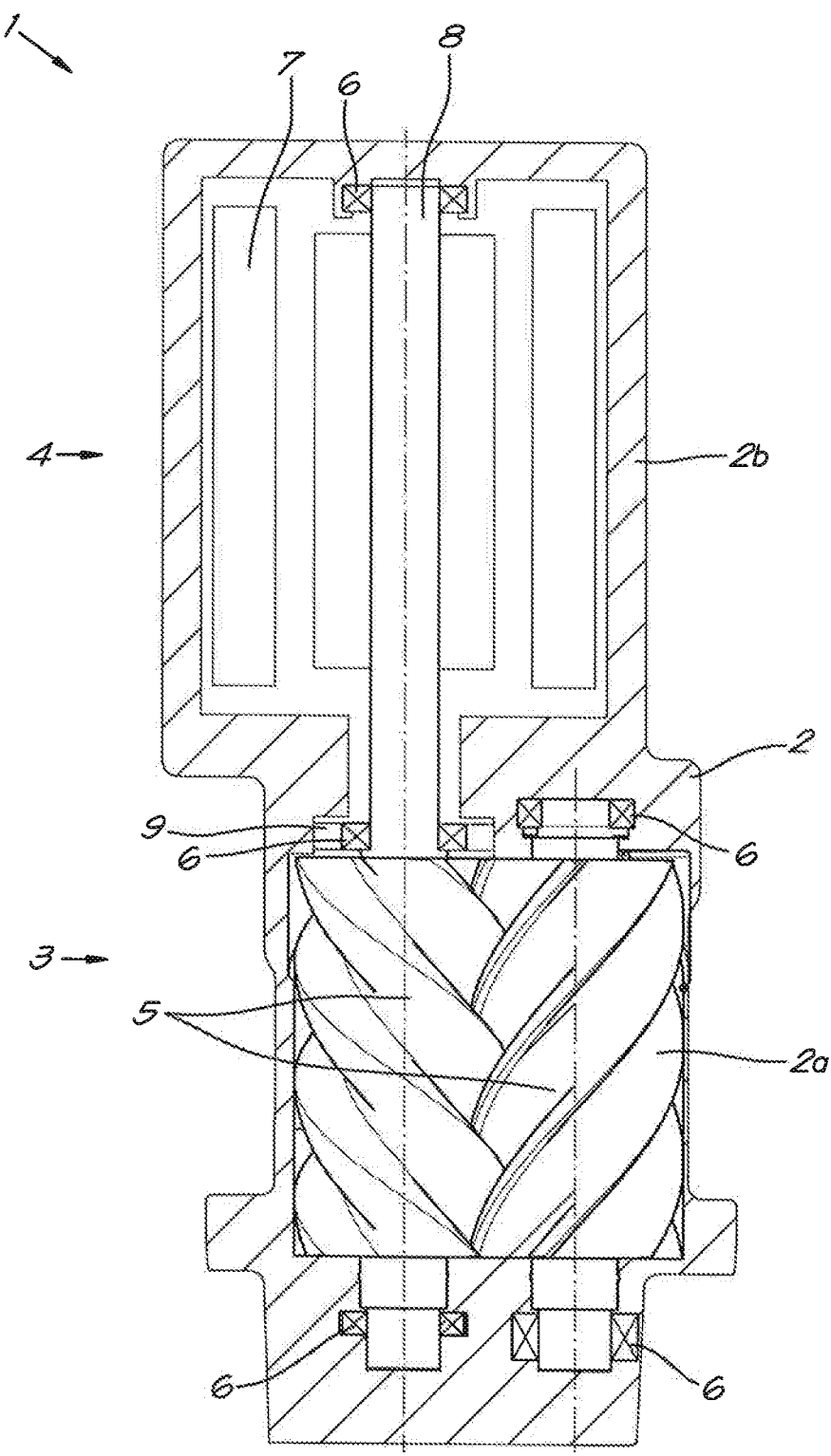
FIG. 1 provides a schematic cross section of a compressor device according to the invention.

Compressor element 1 schematically shown in FIG. 1 comprises a housing 2 containing in this case one compressor element 3 and a drive 4 for compressor element 3.

Housing 2 comprises a section 2*a* for the drive 4 and a section 2*b* for compressor element 3.

Compressor element 3 comprises two rotors 5 installed in the housing 2 by means of bearings 6.

In this case, drive 4 is an electric motor with a motor stator 7 and a motor rotor 8, the latter rotatably installed using bearings 6 in the housing 2.

In this case, there is one bearing 6 that carries a static axial load.

Of course, it is not excluded that there are several bearings 6 that carry static axial loads.

Figure 3:
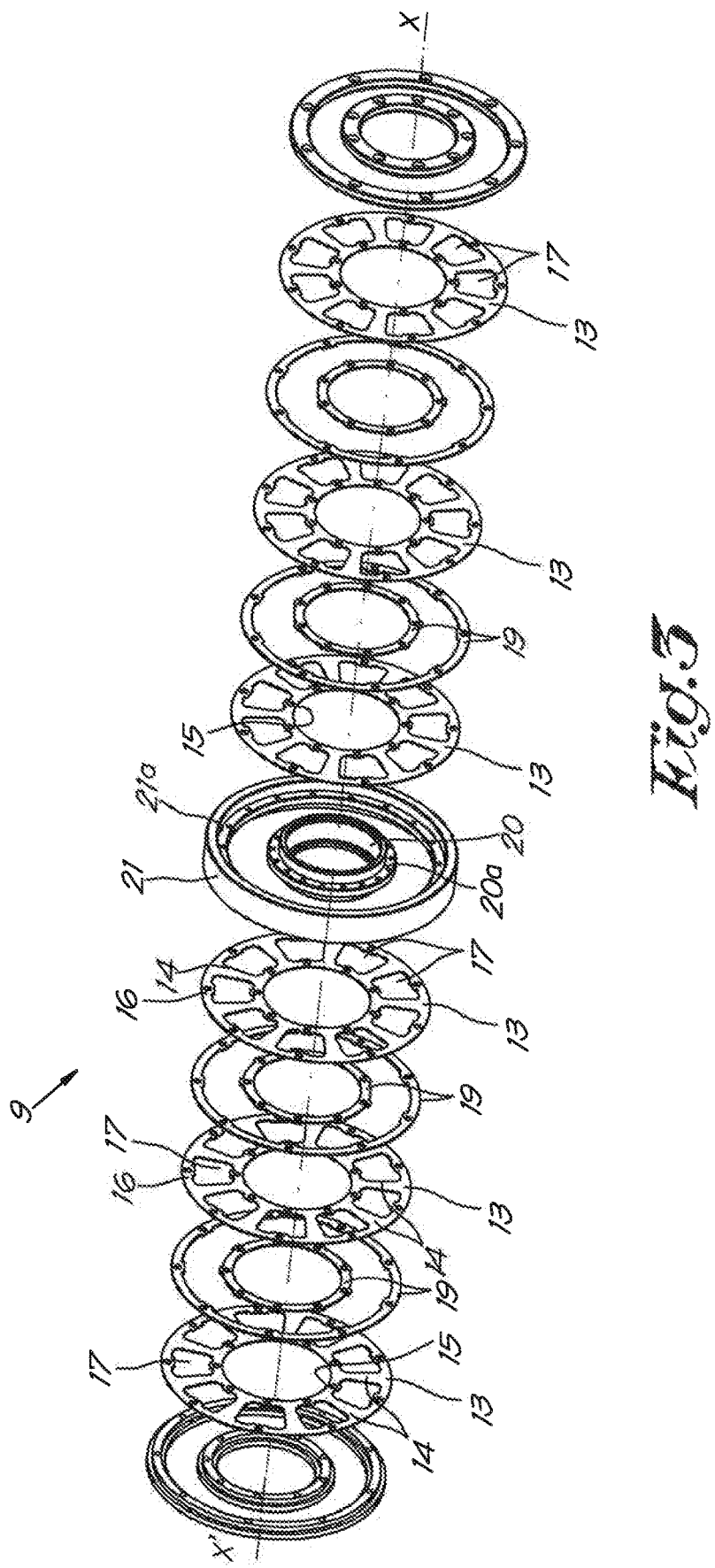
FIG. 3 shows an exploded view of the bearing damper (without damping element) of FIG. 2.

Said bearing 6 is fitted with a bearing damper 9, which is shown in more detail in FIG. 2-4.

The bearing damper element 9, schematically shown in FIGS. 2-4, mainly comprises a coupling element 10 and at least one damping element 11 made from a damping elastomer material.

In this case, the coupling element 10 is a ring-shaped element 12 which includes at least one ring 13.

This coupling element 10 is intended to install the bearing damper 9 between a bearing 6 of compressor device 1 and the housing 2 of compressor device 1. In other words, it forms the link between the bearing 6 and the housing 2.

In this case, the ring-shaped element 12 includes at least two rings 13 which are adjacent to each other. Between the rings 13, said damping elements 11 are provided, as described in detail below.

In the example of the figures and as clearly shown in FIG. 3, there are six such rings 13.

In this case, but not necessary for the invention, these rings 13 are made of steel or spring steel.

The rings 13 are also thin in the axial direction X-X', preferably with a thickness of up to five millimeters and preferably not more than two millimeters. In this case, the rings 13 are one millimeter thick. Of course, it is not excluded that the rings 13 are thicker than five millimeters.

According to the invention, the rings 13 are fitted with spokes 14, which extend between the inner edge 15 and the outer edge 16 of the respective ring 13.

This means that the rings 13 are not solid, but fitted with holes 17 or passages between the spokes 14.

This not only reduces the weight of the rings 13, but also ensures that the rings 13 and particular their spokes 14 possess a certain flexibility in the axial direction X-X'. In the radial direction X-X', the rings 13 are stiff.

The rings 13 are also oriented to ensure that the spokes 14 are mutually aligned.

Consequently, said holes 17 or passages are also mutually aligned so that the coupling element has 10 passages 18 through its axial thickness B.

However, this is not necessary for the invention, for example the spokes 14 of the three left-hand rings 13 could be aligned as well as the spokes 14 of the three right-hand rings 13, while the spokes 14 of the three left-hand rings 13 are not aligned with the spokes 14 of the three right-hand rings 13.

Between the aligned spokes, said damping elements 11 are provided, made of damping elastomer material. This is shown in the cross-section of FIG. 4. In this case, the damping elements 11 take the form of block-shaped elements.

In this case, a damping element 11 is provided between all aligned spokes 14, i.e. a damping element is attached to all spokes 14 of a ring 13.

Of course this is not necessary, also if only half of the spokes 14 could be fitted with a damping element 11.

In addition, a damping element 11 is provided between each pair of consecutive rings 13.

This is not necessarily the case, it might also be that damping elements 11 are not provided between each pair of two consecutive rings 13, but for example only between every other pair of rings 13.

To sum up, it could be said that quantity of damping elastomer material that is provided between the spokes 14 can freely be selected in accordance with the specific application and required damping.

In this case, but not necessary for the invention, damping elements 11 are made of rubber.

The rubber is attached to or against the spokes 14 by vulcanization. The rubber may also be clamped between the spokes 14.

As clearly shown in FIG. 3, spacers 19 are provided between the inner edges 15 and the outer edges 16 of two consecutive rings 13.

In this case, those are the narrow ring-shaped spacers 19. Of course, it is clear that these spacers 19 can also be designed differently, for instance in the form of small blocks which are inserted along the circumference of the inner edges 15 and outer edges 16 between two consecutive rings 13.

In order to keep the rings 13 of coupling element 10 together, the bearing damper 9 in the example of FIGS. 2-4 is provided with both an inner clamping strip 20 and an outer clamping strip 21.

It is possible that only the inner or outer clamping strip 20, 21 is provided. However, in most cases both clamping strips are required 20, 21.

The inner clamping strip 20 holds the rings 13 together along their inner edge 15 and the outer clamping strip 21 holds them together along their outer edge 16.

Making the clamping strips 20, 21 wider or narrower in the axial direction X-X', will make it possible to join more or fewer rings 13 into a ring-shaped element 12 of the coupling element 10.

As shown in FIG. 4, the inner clamping strip 20 along the outside 20a has a rib 22 that runs all around and the outer clamping strip 21 has a similar rib 22 along its inside 21a.

These ribs 22 serve as a spacer between the two center rings 13 and thus form another embodiment of a spacer 19.

Both the inner and outer clamping strip 20, 21 may serve as the outer ring 23a or the inner ring 23b of the bearing 6.

Figure 5:
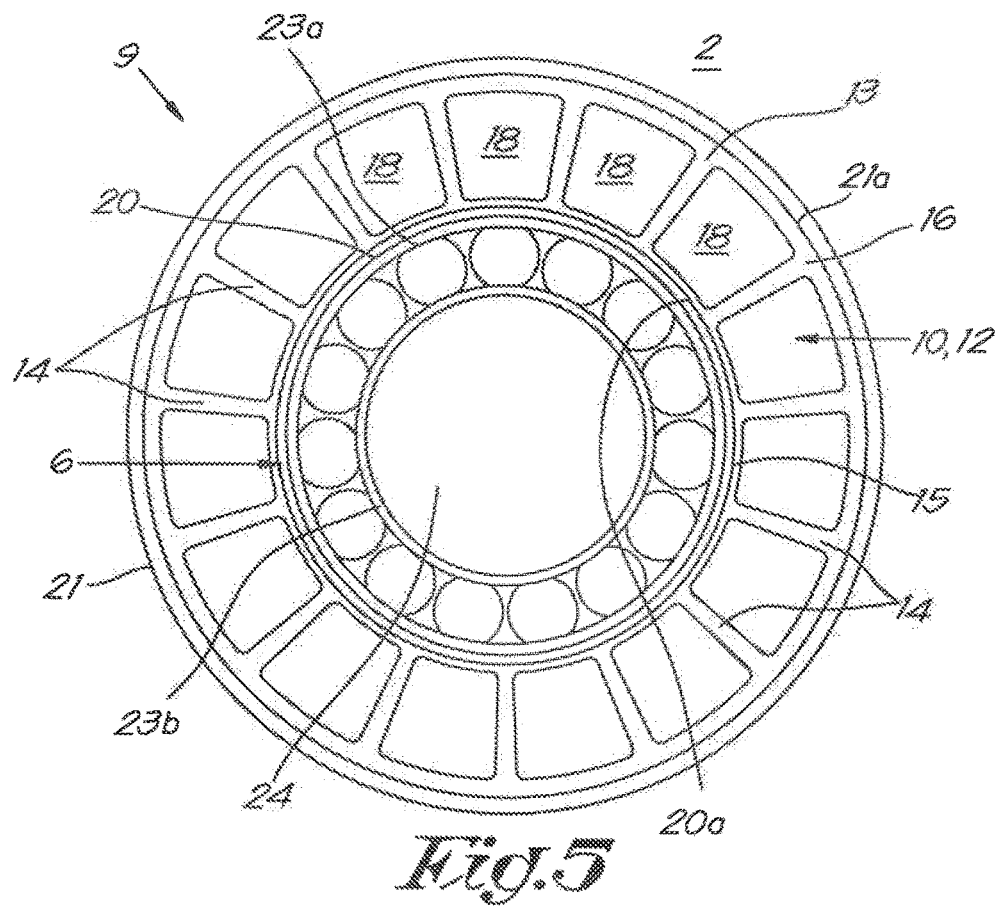
FIG. 5 shows the bearing of FIG. 1 provided with the bearing damper of FIG. 2.

In the example of FIG. 5, the bearing 6 of FIG. 1 is shown, which is provided with a bearing damper 9 as in FIG. 2, wherein the inner clamping strip 20 serves as an outer ring 23a of a bearing 6.

The inner ring 23b of the bearing 6 is mounted on the shaft 24 of the rotor 8 of the drive 4.

Obviously, it is also possible that the outer clamping strip 21 serves as inner ring 23b of the bearing 6, i.e. the bearing 6 is as it were around the bearing damper 9, although this situation is less common.

Of course, it is also possible that the bearing 6 with its outer ring 23a is pressed into the inner clamping strip 20. This has the advantage that a standard bearing 6 can be used.

Although in the example shown the clamping strips 20, 21 and the rings 13 are separate elements or components of the bearing damper 9, it is not excluded of course, that said elements are either one assembly or made as one piece.

The operation of the bearing damper 9 is very simple and as follows.

Bearing 6, with bearing damper 9, of FIG. 5, is integrated into the housing 2b of the compressor element 3, wherein the bearing 6 will be supporting shaft 24 of rotor 5.

While compressor element 1 is in operation, axial vibrations or oscillations will occur, while the shaft 24 will move in the axial direction X-X'.

As a result, the bearing 6 and the inner clamping strip 20 of the bearing damper 9 will move according to the arrow C in FIG. 4.

The outer clamping strip 21 will not move because it is installed static or secured in the housing 2b of compressor element 3.

Figure 6:
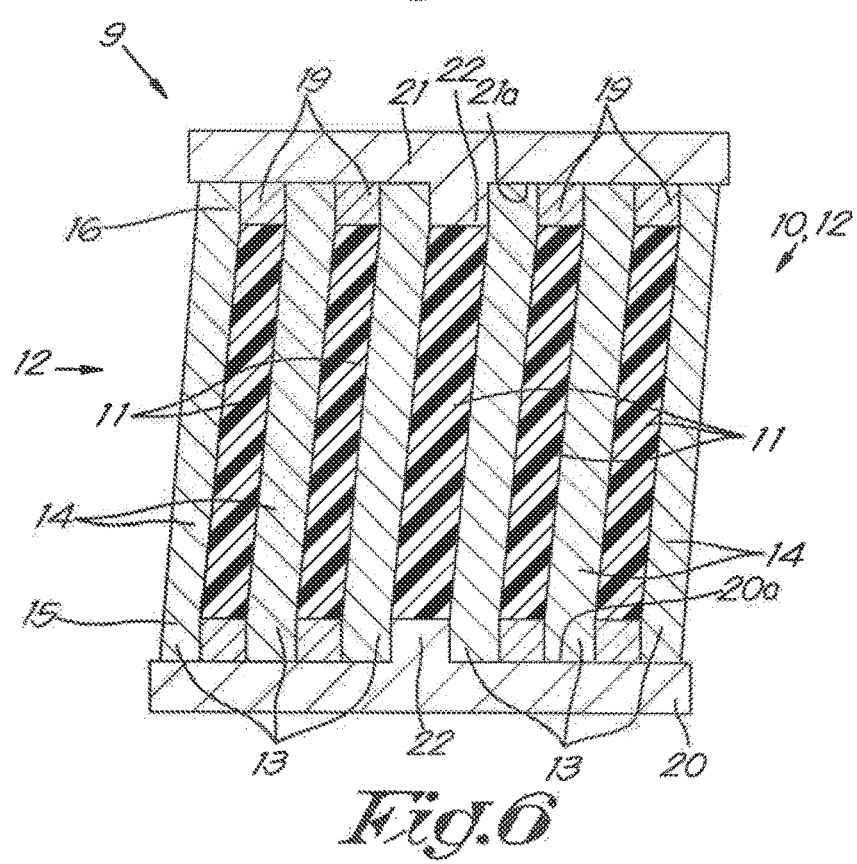
FIG. 6 schematically shows the operation of the bearing damper of FIG. 2.

This relative movement of the inner clamping strip 20 relative to the outer clamping strip 21 will deform the flexible spokes 14 of the rings 13 as shown in FIG. 6.

The magnitude of the axial displacement of the inner clamping strip 20 and, consequently, also the deformation of the spokes 14, will depend, among other things, on the thickness A of the rings 13, the number of spokes 14, the quantity of damping elastomer material of the damping elements 11. These parameters may be freely selected in advance, which makes it possible to determine in advance what the maximum axial displacement will be under the influence of said vibrations.

It is important to note here that the spokes 14 will only deform in the axial sense. In the radial sense, the spokes 14 are sufficiently rigid or non-deformable, so these allow little or no movement of the inner clamping straight 20 relative to the outer clamping strip 21.

The deformation in the axial sense will deform the rubber between the spokes 14. This causes the rubber to be subjected to shear stress.

As a result, the axial vibrations will be damped, as the forces will be absorbed by the spokes 14 and the rubber.

The bearing 6 itself will the subjected to much lower forces and stresses, since these will for the better part be absorbed by the bearing damper 9.

Moreover, it will be possible to limit the axial movement of the shaft 24 due to the above vibrations, by choosing the appropriate stiffness and damping properties of the bearing damper 9, since vibrations will be prevented from propagating any further into the motor and the compressor device.

This avoids problems due to these axial vibrations and the axial displacement of the shaft 24 further downstream in the machine.

Figure 7:
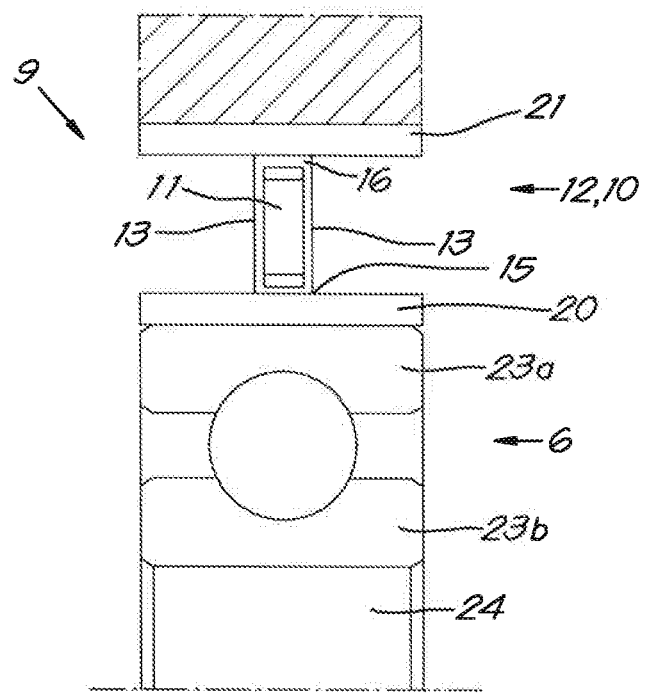

FIG. 7 shows a variant of FIG. 3, wherein in this case the coupling element 10 is only provided with two rings 13 that are not fitted with spokes 14.

However, the inner and outer clamping strips 20, 21 are still designed as broad as in the previous embodiment, for instance to facilitate assembly.

Figure 8:
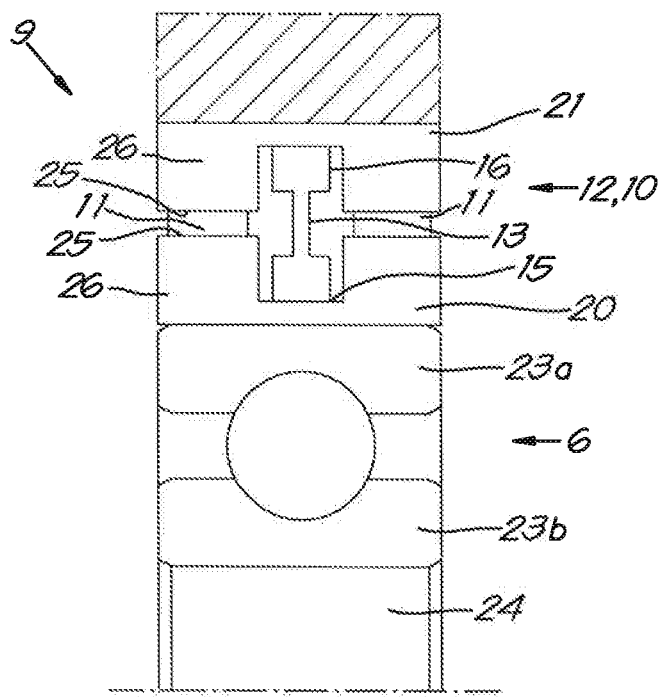

Another embodiment is shown in FIG. 8, in which case the coupling element 10 only includes one ring 13. This ring 13 may or may not contain spokes 14.

An inner and an outer clamping strict 20, 21 are also provided.

Both the inner and outer clamping strip 20, 21 have a clamping surface 25 which extends in the axial direction X-X', between which the damping element 11 is installed.

In this case, there are two clamping surfaces 25 per clamping strip 20, 21, so also two damping elements 11.

In this case, the damping elements are 11 ring-shaped, but this is not necessarily the case.

This relative displacement of the inner clamping strip 20 relative to the outer clamping strip 21 will cause the corresponding clamping surfaces to shift 25 relative to each other.

This causes the damping elements to deform 11. As a result, the damping elastomer material will be subjected to shear stress. While in the previous example this involves a radial shear stress, in this example it is exerted in the sense X-X'.

Otherwise, the system is similar.

Figure 9:
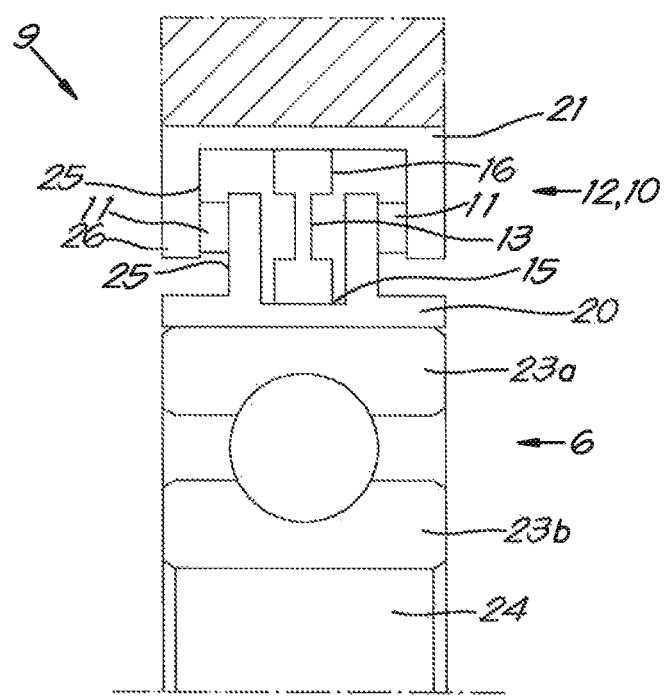

FIG. 9 finally shows a variant of FIG. 8, wherein in this case said clamping surfaces 25 extend in the radial direction.

For this purpose, the inner and the outer clamping strips 20, 21 are provided with radial collars 26 or flanges.

The damping elements 11 which are located between the clamping surfaces 25 will be under compression load when the inner clamping strip 20 moves relative to the outer clamping strip 21.

Otherwise, the system is similar.

Although the examples shown and described above always refer to a compressor device 1, the bearing damper 9 may also be used in other devices comprising a rotating shaft 24 which is carried by, or mounted in, the machine by means of a bearing 6.

The current invention is by no means limited to the embodiments described as examples and shown in the figures, but a compressor device according to the invention can be implemented in all shapes and sizes without going beyond the scope of the invention.

The invention claimed is:

1. A compressor device with a housing and provided with at least one compressor element and a drive for the compressor element, wherein all bearings of at least one shaft in the compressor device configured to carry static axial load, are provided with a bearing damper which comprises a coupling element and at least one damping element made of a damping elastomer material,
   wherein the bearing damper is installed with the aid of the coupling element between a bearing of the compressor device and the housing of the compressor device,
   wherein the coupling element allows little or no movement of the bearing relative to the housing in the radial direction compared to the axial direction,
   wherein the at least one damping element is configured to dampen the axial movement of the bearing relative to the housing, and
   wherein the coupling element is a ring-shaped element which includes at least two rings, and the at least two rings are held together along their inner edges and/or outer edges by an inner clamping strip and/or an outer clamping strip respectively.

2. The compressor device according to claim 1, wherein the at least two rings are made of steel or spring steel.

3. The compressor device according to claim 1, wherein the coupling element has a thickness in the axial direction of not more than five millimeters.

4. The compressor device according to claim 3, wherein the at least two rings have a thickness in the axial direction of not more than two millimetres.

5. The compressor device according to claim 1, wherein said at least two rings, the inner clamping strip and the outer clamping strip are either one assembly or made as one piece.

6. The compressor device according to claim 1, wherein the inner clamping strip and the outer clamping strip are provided with clamping surfaces between which the damping element is located, and wherein the clamping surfaces extend in the axial direction or in the radial direction.

7. The compressor device according to claim 1, wherein the coupling element is composed of the at least two rings, and wherein the at least one damping element is provided between the adjacent rings of the at least two rings.

8. The compressor device according to claim 7, wherein each ring of the at least two rings are provided with spokes extending between a respective inner edge and a respective outer edge, wherein the spokes of the first ring are aligned with the spokes of the second ring, and wherein the at least one damping element is fixed between the aligned spokes of adjacent rings of the at least two rings.

9. The compressor device according to claim 8, wherein the at least one damping element is made of a rubber and fixed against the aligned spokes by vulcanizing or clamping.

10. The compressor device according to claim 7, wherein the at least two rings includes at least three rings, wherein each ring of the at least three rings are provided with spokes extending between respective inner and outer edges of the at least three rings, wherein the spokes of the at least three rings are aligned, and wherein the at least one damping element comprises multiple damping elements that are fixed between all of the aligned spokes.

11. The compressor device according to claim 7, wherein an inner spacer is provided between the inner edge of two consecutive rings of the at least two rings, and an outer spacer is provided between the outer edge and the two consecutive rings.

12. The compressor device according to claim 7, wherein the at least one damping element is made of a rubber and fixed against the at least two rings by vulcanizing or clamping.

13. A device with a housing comprising a rotating shaft with a bearing,
   wherein the bearing is provided with a bearing damper comprising a coupling element and at least one damping element made of damping elastomer material,
   wherein the bearing damper is provided with the aid of the coupling element between the bearing and the housing of the device,
   wherein the coupling element allows little or no movement of the bearing relative to the housing in the radial direction,
   wherein the at least one damping element is configured to dampen the axial movement of the bearing relative to the housing, and
   wherein the coupling element is a ring having a thickness in the axial direction of not more than five millimeters.

14. A compressor device with a housing and provided with at least one compressor element and a drive for the compressor element, wherein all bearings of at least one shaft in the compressor device configured to carry static axial load, are provided with a bearing damper which comprises a coupling element and at least one damping element made of a damping elastomer material,
   wherein the bearing damper is installed with the aid of the coupling element between a bearing of the compressor device and the housing of the compressor device, wherein the coupling element allows little or no movement of the bearing relative to the housing in the radial direction compared to the axial direction,
wherein the at least one damping element is configured to dampen the axial movement of the bearing relative to the housing, and
wherein the coupling element is a ring having a thickness in the axial direction of not more than five millimetres.

* * * * *